US006980547B1

(12) United States Patent
Gally et al.

(10) Patent No.: US 6,980,547 B1
(45) Date of Patent: Dec. 27, 2005

(54) DISTRIBUTED SWITCH/ROUTER SILICON ENGINE

(75) Inventors: Robert G. Gally, Beaverton, OR (US); Eric W. Multanen, Portland, OR (US); Per F. Hansen, Soeborg (DK)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 09/702,630

(22) Filed: Oct. 31, 2000
(Under 37 CFR 1.47)

(51) Int. Cl.[7] .............................................. H04L 12/28
(52) U.S. Cl. ....................... 370/389; 370/400; 370/401
(58) Field of Search ............................... 370/389, 392, 370/398, 399, 400, 401, 402

(56) References Cited

U.S. PATENT DOCUMENTS

| | | | | |
|---|---|---|---|---|
| 5,461,624 | A * | 10/1995 | Mazzola | 370/402 |
| 5,909,686 | A * | 6/1999 | Muller et al. | 707/104.1 |
| 6,101,170 | A * | 8/2000 | Doherty et al. | 370/255 |
| 6,108,702 | A * | 8/2000 | Wood | 709/224 |
| 6,128,296 | A * | 10/2000 | Daruwalla et al. | 370/389 |
| 6,301,257 | B1 * | 10/2001 | Johnson et al. | 370/406 |
| 6,335,935 | B2 * | 1/2002 | Kadambi et al. | 370/396 |
| 6,560,229 | B1 * | 5/2003 | Kadambi et al. | 370/392 |
| 6,577,636 | B1 * | 6/2003 | Sang et al. | 370/395.7 |
| 6,678,269 | B1 * | 1/2004 | Michels et al. | 370/389 |
| 6,697,362 | B1 * | 2/2004 | Akella et al. | 370/389 |
| 6,711,161 | B1 * | 3/2004 | Erimli | 370/360 |
| 6,829,651 | B1 * | 12/2004 | Bass et al. | 709/238 |

* cited by examiner

*Primary Examiner*—Ajit Patel
*Assistant Examiner*—Steven Blount
(74) *Attorney, Agent, or Firm*—Pillsbury Winthrop Shaw Pittman LLP

(57) ABSTRACT

A method and system for providing a remote switching engine to monitor and control network traffic and utilizing appended word source address port mapping is provided. The system comprises a number of ports, at least one local switching device, at least one local forwarding database, and a remote switching processing device. The ports are provided for sending and receiving frames. The local switching device performs high-speed switching. The local forwarding database corresponds and couples to the local switching device, the database allowing the local switching device to look up a known address that has been previously obtained and forward the frames based on the known address. The remote switching processing device receives and processes frames from the local switching device(s). The local switching device(s) learns associations between Media Access Control (MAC) addresses and ports by having the local switching device forward unknown address frames to the remote switching processing device. The remote switching processing device update the local forwarding database corresponding to the local switching device based on the forwarded frames, utilizing the appended word source address mapping. The appended word of a frame transmitted from one switching device to another switching device has encoded within an ingress engine number and port number.

4 Claims, 5 Drawing Sheets

DISTRIBUTED SWITCH/ROUTER SILICON ENGINE

BACKGROUND OF THE INVENTION

1. Field of the Invention

The present invention relates to the field of network communications. More particularly, the present invention relates to systems and methods for providing a remote switching engine to monitor and control network traffic, wherein appended word source address port mapping is utilized.

2. Related Art

Computer networks in business enterprises, such as a local area network (LAN), wide area network (WAN) or other Ethernet-based systems, facilitate communication among computer workstations. The pressure on these networks is steadily increasing. More and more users are demanding more information and faster speed from increasingly distributed locations. At the same time, demanding new applications and excessive Internet use are not only changing bandwidth requirements, they are also altering traditional traffic patterns.

When LAN networks were first introduced in the 1980's, a physical limit was quickly reached because of the LAN cable limitations. LAN bridges were introduced to solve this problem, tying these cables together to form larger networks. The bridge allowed the transparent passing of packets between LAN segments. Moreover, these bridges could also eavesdrop on the packets and learn which media access control (MAC) addresses were on each LAN segment. This allowed them to keep unicast traffic on the appropriate LAN segment. To utilize the bridges, MAC level broadcasts were required. Broadcasts not only used network bandwidth, but they also used processing power on every host system to which the broadcast was being passed. The processor on the host system had to analyze every broadcast packet up through the network layer to see if the packet was addressed to it. Eventually, MAC level broadcasts became an intolerably large percent of the network traffic. To solve this problem, routers were introduced to segment the network into separate domains.

At the router boundary, all broadcasts were intercepted and the router would decide which LANs on which the broadcast would be propagated. To achieve this, the router would look into level 3 headers and force a network to be segmented into network level broadcast domains. Although this solved the problem of excessive broadcasts within the network, it introduced an expensive device that would add latency, limit throughput and increase complexity of the network. To limit the throughput loss across a router, users were forced into topologies where servers and clients needed to remain within the same broadcast domain. Therefore, switches were then introduced to allow the creation of Virtual Local Area Networks (VLAN), allowing users to segment their networks without the high costs of routers or low port count of bridges. The first generation switches forwarded packets through the VLAN without examining the packet validity until after the packet had been forwarded. These switches did not prevent the occurrence of unnecessary and excessive traffic across the VLAN, which slowed down the network and required each end node and computer connected to the network to receive and analyze those packets. This led to the overall loss of network bandwidth. To solve this problem, second-generation switches were created.

The second generation switches implement broadcast isolation and level 3 network switching at the switch level through end-to-end learning sequences, or learning hits. The second-generation switch comprises a switching application specific integrated circuit (ASIC) and a central processing unit (CPU) connected to a plurality of ports. The switching ASIC has a database which enables it to look up addresses that it has previously obtained and to forward frames to the addresses. When frames are to be sent through a second-generation switch, or a number of them, the switch(es) has to become aware of the location of the sender and the receiver of the frames. That is, the switch(es) has to learn ports with which source addresses and destination addresses of the frames are associated and update the information into the database.

FIG. 1 shows normal control frame paths of a prior art system in which switching ASICs learn the ports where the sender and the receiver reside. Three stacked switches 10, 20, 30 are illustrated in FIG. 1. Each of these switches includes a local CPU and a switching ASIC. For example, the switch 10 includes a local CPU 12 and a switching ASIC 15. In a normal frame control path, such as control paths 13, 23, 33, frames received by the switch 10 with unknown addresses are sent to the local CPU 12 through a PCI bus for the required learning. This introduces the requirement of having a CPU in every platform containing a switch. Overheads, such as the PCI bus, memory, flash, etc. are also present. Together, they increase costs to a system having many of these platforms. In addition, with different local CPUs monitoring and managing network traffic separately, a single point of management is not achieved. Therefore, there is a need for a system and method to provide a system that eliminates the need for having a CPU in every platform while allowing a single logical platform that facilitates a single point of management.

DETAILED DESCRIPTION

Figure 1:
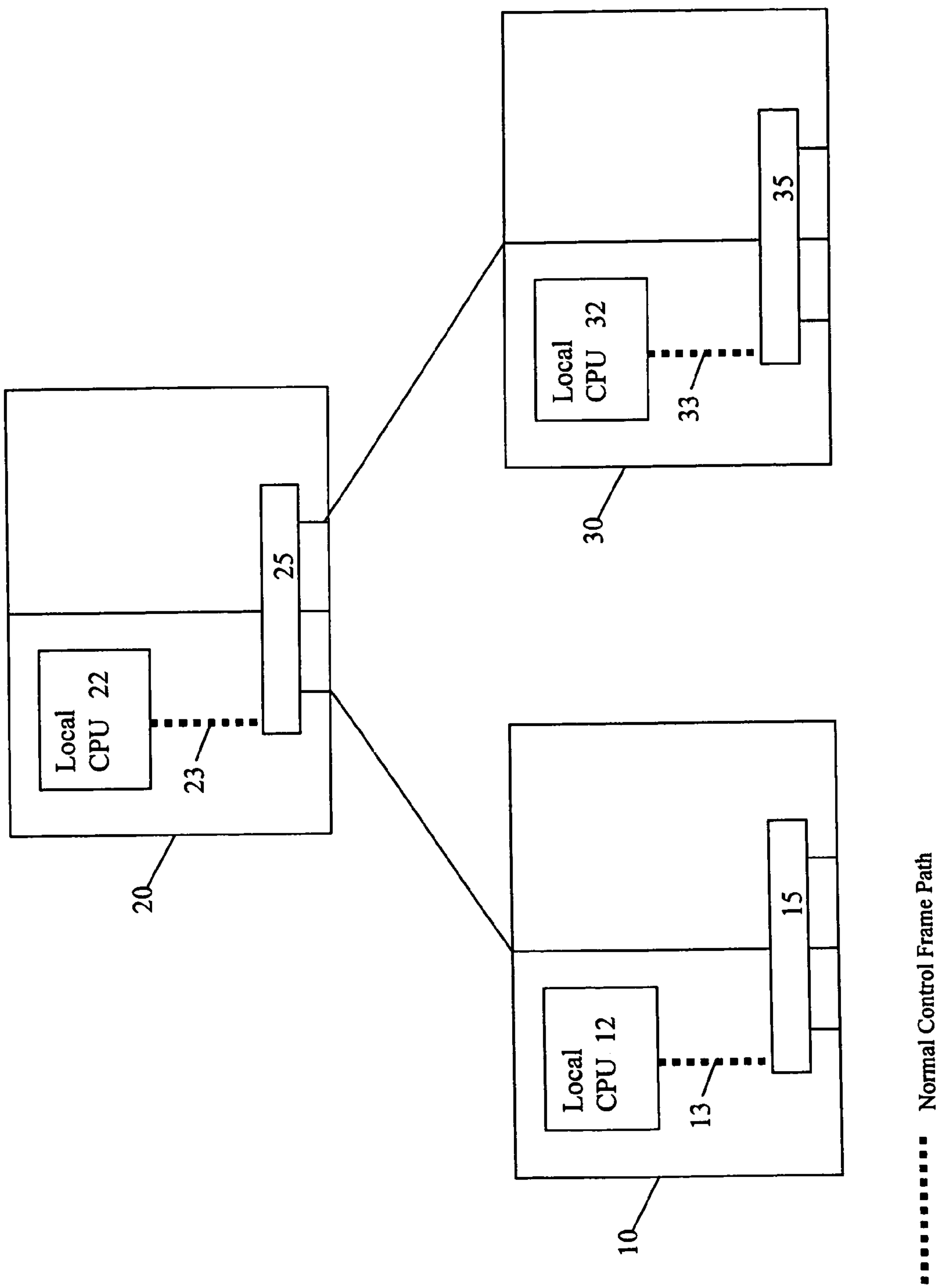
FIG. 1 shows normal control frame paths of a prior art system.
Figure 2:
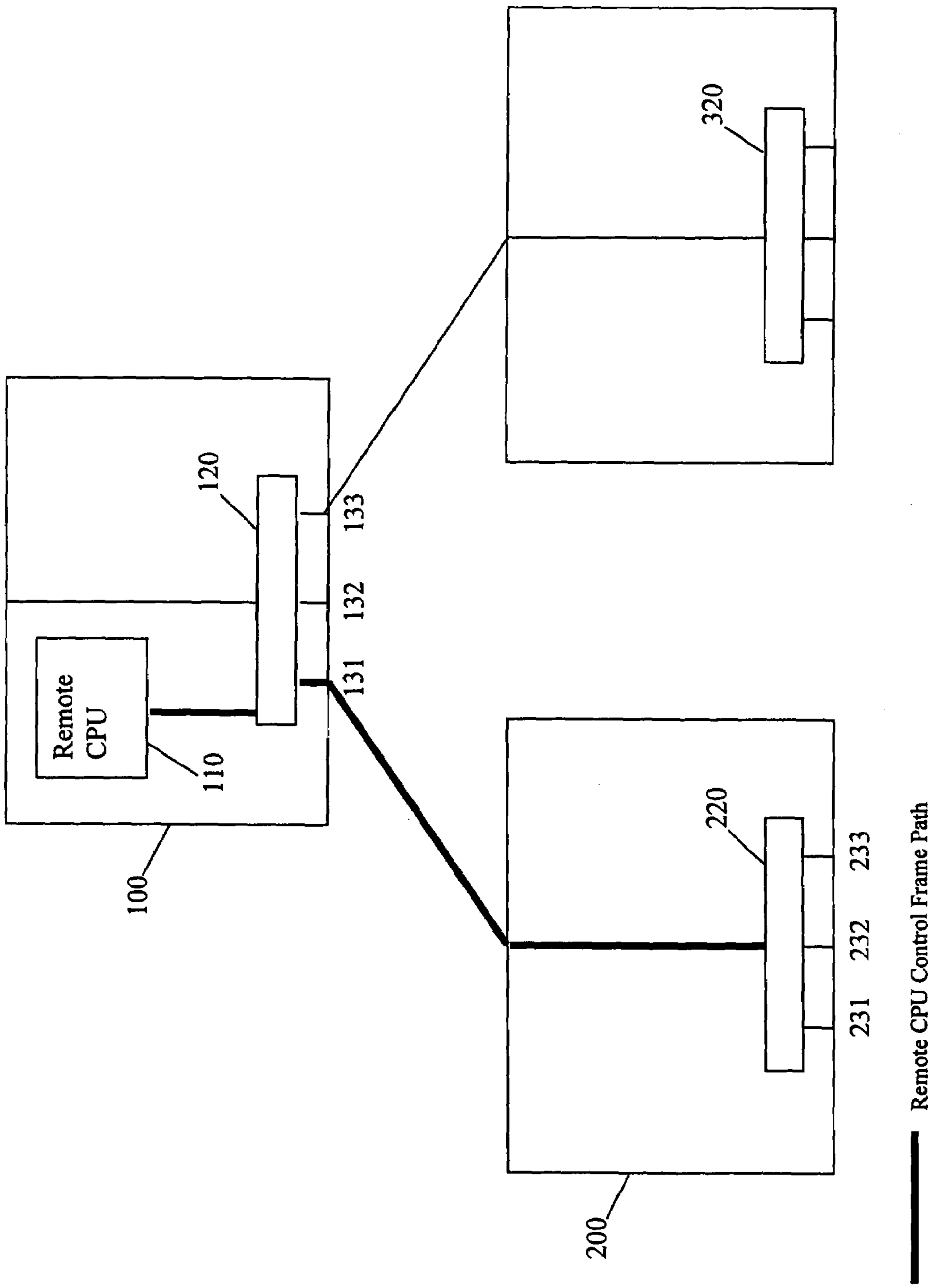
FIG. 2 shows a remote control frame path according to an embodiment of the present invention.

Embodiments of the present invention are directed to systems and methods for providing a remote switching processing device to monitor and control network traffic, wherein appended word source address port mapping is utilized. In one embodiment, the system preferably includes a number of distributed switching systems connected together in a network. In FIG. 2, three switching systems 100, 200, 300 are illustrated as an example. The switching systems 100, 200, 300 may, for example, be stacked Ethernet switches that generally function as a single large switch. At least one of the switching systems includes a remote switching processing device 110 that is utilized to monitor and control network traffic through the switching systems 100, 200, 300. Each of the switching systems 100, 200, 300 includes a switching chip or module for high-speed packet switching. Each of the switching chips 120, 220, 320 within the switching systems 100, 200, 300 is connected to a number of network ports that interconnect the switching systems 100, 200, 300 and hosts in the network. For example, the switching chip 120 is shown to be connected to three network ports, with stack port 131 connecting the switching system 100 and the switching system 200, and stack port 133 connecting the switching system 100 and the switching system 300.

As configured in FIG. 2, the switching system 100 that contains the remote processing device 100 may be referred to as a remote switching system. The switching systems 200, 300 containing only the switching chips 220, 320 may be referred to as distributed switching systems. The remote switching processing device 110 in the remote switching system 100 may, for example, be a central processing unit (CPU). The switching modules or chips 120, 220, 320 may, for example, be switching Application Specific Integrated Circuits (ASICs). The switching ASICs 120, 220, 320 may, for example, perform level 4 switching functions, level 3 switching functions, level 2 switching functions, level 3 router functions, and/or level 4 router functions. Although the switching functions in this embodiment have been described using ASICs, the switching ASIC functions may be implemented in software using a high-speed CPU or by hardware configurations not dependent on ASICs.

In one embodiment, each of the switching ASICs 120, 220, 320 has a Media Access Control (MAC) address lookup database (not shown). A MAC function converts digital information, typically stored in memory in the form of a packet, into an actual Ethernet frame that can be transmitted on an Ethernet connection, or a frame received from the network connection which is stored in memory as a packet. The MAC address lookup database allows each of the switching ASICs 120, 220, 320 to look up MAC addresses that each has previously obtained and to forward packets or frames to the MAC addresses. For switching decisions that cannot be determined within the switching ASICs 220, 320 of the distributed switching systems 200, 300, the remote switching processing device 110 makes such switching decisions.

Conversations between devices on a network, such as the switching systems 100, 200, 300 can be thought of as a matter of requests and responses. For example, a sender may wish to send frames or packets to a receiver through a switching system(s). The sender and receiver may, for example, be a switch, router, device for switching and routing, or host connected to network ports. Before frames can be sent to the receiver through the switching system(s), the switching system(s) must learn the source address and destination address for the frames to be transmitted. The switching system(s), and more specifically, a switching ASIC(s) within the switching system(s) has to become aware of the sender and the receiver, and vice versa. This is achieved by having the remote switching processing device 110 update the MAC address lookup database of the switching ASIC(s) and encoding an ingress switch number and incoming port number in an appended word of a frame transmitted to an egress switch. The MAC address lookup database of the switching ASIC(s) is also referred to as a switch silicon forwarding database.

In a scenario where a sender residing on port 233 wishes to send frames to a receiver through the switching system 200, the first frame, or a portion of the frames, is first transmitted from the sender to the switching system 200 through port 233. As the frame enters port 233, it is received by the switching ASIC 220. The switching ASIC 220 extracts the source address of the frame and learns that the sender is on port 233. The switching ASIC 220 also extracts destination address of the frame and sends it to the MAC address lookup database. At this point, the destination address does not exit in the MAC address lookup database, and the switching ASIC 220 has to learn the destination address and with which port the destination address is associated. Since the frame is going to an unknown location, the frame is sent to all ports. At some point, the receiver is going to receive the frame and send a response back to the switching ASIC 220. When the switching ASIC 220 receives this response, the response will come back on a single port. The switching ASIC 200 extracts the source address of the response and sends it to the MAC address lookup database. Since this source address does not exist in the MAC address lookup database, the switching ASIC 220 forwards the response to the remote switching processing device 110 in the form of a response frame. This is accomplished by using one of the Ethernet ports. Stack port 131 is used as an illustrative example in FIG. 2.

The response frame indicates to the remote switching processing device 110 that this source address of the response is unknown. The response frame is further packaged by the switch ASIC 220 in a manner such that the remote switching processing device 110 would recognize the response frame to be a special frame for the remote switching processing device 110. The remote switching processing device 110 recognizes this special frame and determines that the special frame is not to be forwarded to another location. Instead, the remote switching processing device 110 is to consume the response frame, process it, and respond to the switching ASIC 220 with a processing device directive. In other implementations, the frames may be required to be forwarded and not consumed by the switching processing device 110.

The processing device directive from the remote switching processing device 110 instructs the switching ASIC 220 to first put in its MAC address lookup database that the address of the response resides on the port through which the response was received. An identifier is also included in the processing device directive to tell the switching ASIC 220 to consume the frame and not to forward it. Thus, the next time the switching ASIC 220 encounters a source or destination address that coincides with the address of the response, the switching ASIC 220 knows with which port the source or destination address is associated. By the remote switching processing device 110 updating the MAC address lookup database of the switching system 200 with the source address of the sender and the destination address from the response of the receiver, the switching ASIC 220 becomes aware of the sender and the receiver, and vice versa.

In particular, a switching ASIC will forward the first frame of the flow to the remote switching processing device 110 when the switching ASIC does not find a forwarding entry in its MAC address lookup database. The remote switching processing device 110 learns the incoming port number and the Ethernet address of the source address and updates it in its MAC address lookup database. By using Ethernet ports to send learning frames to, and receiving learning frames from, switching ASICs, the remote switching processing device 110 also programs the outgoing port number and the Ethernet address of the destination address into the MAC address lookup database. The first frame is then routed on the port that has the destination node connected through it. Once the entries are created in the MAC address lookup table for the source and destination, all the packets belonging to the flow are routed in hardware at wire speed. In one embodiment, if the switching ASIC 220 is enabled to do IP or IPX routing, then it performs a packet validation step that checks to see if the frames are correctly formatted and eligible for routing. In other embodiments, packets belonging to protocols other than IP and IPX will be switched in hardware at wire speeds using the Layer 2 switching algorithm.

Figure 3:
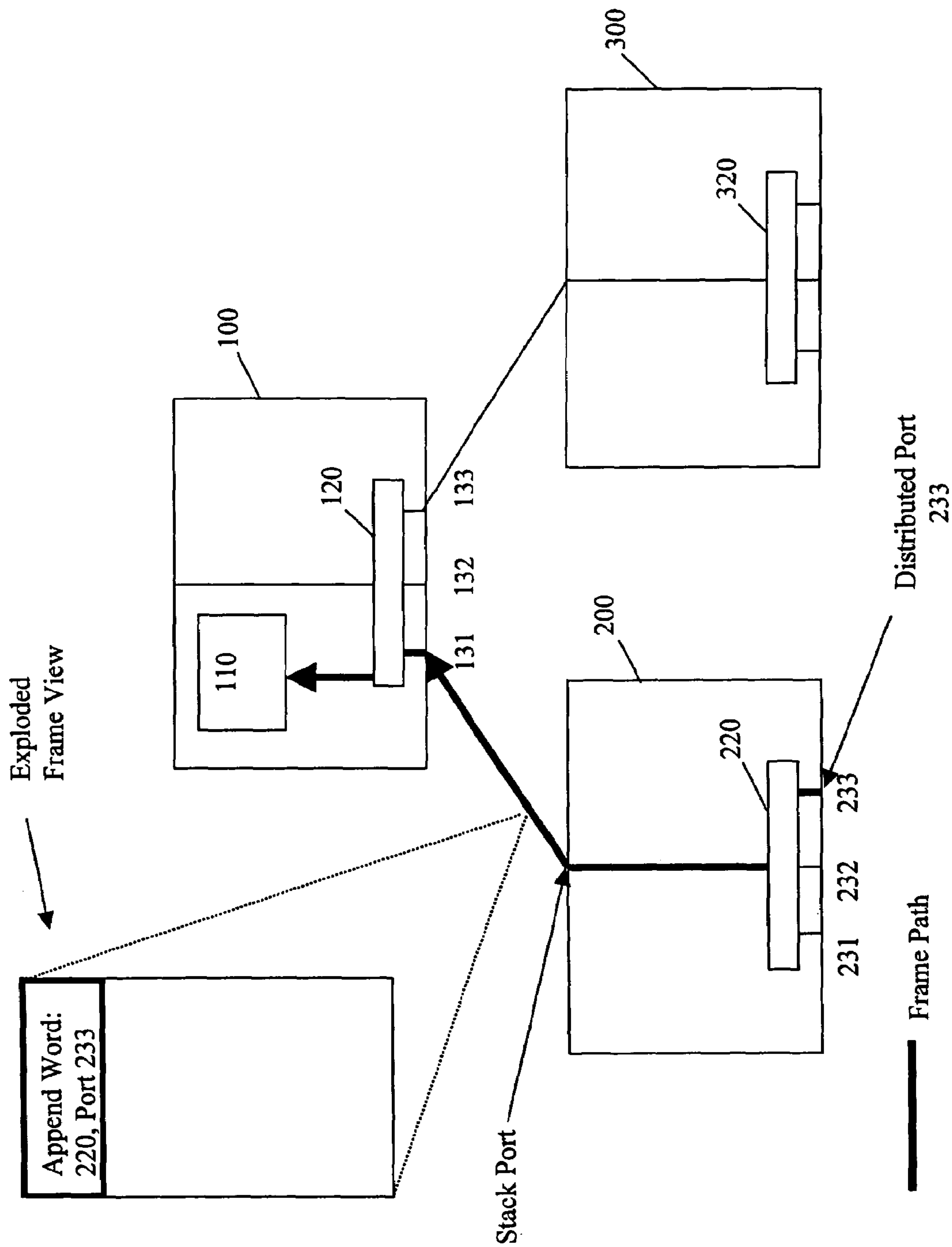
FIG. 3 illustrates a frame transmitted in the remote control frame path of FIG. 2.

FIG. 3 illustrates a frame transmitted in the remote control frame path of FIG. 2, wherein appended word source address port mapping is utilized to map previously unknown source addresses to a specific distributed switch ASIC and port number. An appended word facility is used for data and control packets on stacking ports. In the appended word facility, ingress switches are allowed to specify set of egress switches for each packet. Intermediate switches and cross-bars do not need to do any address lookup and can switch based only on the appended word. When the frames reach the egress switch, this switch does an address search to determine what set of local ports should transmit the packet. If the address search is unsuccessful, the egress switch and/or ingress switch must learn and associate the address being searched. The appended word source address port mapping facilitates this address search and learning of the address.

In the embodiment shown in FIG. 3, a frame from port 233 is being transmitted from switching ASIC 220 to switching ASIC 120 via stack port 131. The switching ASIC 220 and port 233 are referred to as an ingress switch engine and an incoming port, respectively. The switching ASIC 120 is referred to as an egress switch engine. The ingress switch engine number and incoming port number are first encoded in an appended word of a frame being transmitted to egress switch engine(s). In FIG. 3, the appended word of an exploded frame view shows the number for switching ASIC 220 and the number for port 233. In one implementation, the appended word is 32 bits and is inserted into an Ethernet frame. This appended word may be added, read, or removed on ports configured for appended word. The information—the switching ASIC 200 number and the port 233 number—is propagated in the packet header when the frame is forwarded to a processing device connected to the egress switch engine. In FIG. 3, the processing device is the remote switching processing device 110 in the remote switching system 100. In other embodiments, the frames may simply be sent to a distributed switching system similar to the distributed switching systems 200, 300. In that case, either the frames are further forwarded to the remote switching processing device 110 or to a local processing device, such as a local CPU, in distributed switching systems. This allows the egress switch engine(s) to map previously unknown source addresses to a specific distributed switch ASIC and port. In this case, the specific distributed switch engine and port are switching ASIC 220 and port 233. With the ingress switch engine number and incoming port number, source address and destination address of a frame can be obtained. In the case of the destination address, it will be the source address of a response frame from a receiver.

Each switching ASIC creates its own mapping of MAC addresses to egress port numbers based upon the frames it receives and with the help of the remote switching processing device 110 updates the MAC address lookup databases or the distributed switch ASIC forwarding databases. Unknown address frames are sent to the remote switching processing device 110, which learns ingress switch engines and incoming port numbers and updates this information in the MAC address lookup database or distributed switch ASIC forwarding database of the distributed switching systems. This is accomplished by using Ethernet ports to send learning frames to, and receive learning frames from, switching ASICs. This mechanism allows autonomous forwarding databases to be compiled independently by all distributed switching ASICs and switching systems in a multi-switching systems without a software protocol. The advantage of each switch ASIC creating its own forwarding database is that no distribution of learned information is required.

In order for the present invention to be operative, the remote switching processing device 110 needs to be able to uniquely identify the originating switching ASICs, such as the switching ASIC 220, in order to send the response back to the originating switching ASICs. Various ways may be implemented to achieve this. In one implementation, a simple logic device on each distributed switch board of a distributed switching system inserts a unique MAC address into the switching ASIC of the distributed switching system at initialization or boot time. This unique MAC address is programmed into a Read-Only-Memory (ROM) on the distributed switchboard during the manufacturing process. When a distributed switching system powers on, it repeatedly broadcasts a frame with an appended word that indicates the unique MAC address of its switching ASIC and the fact that it is currently unmanaged. When the remote switching processing device 110 receives this frame, the remote switching processing device 110 associates a unique engine number with the received unique MAC address. The remote switching processing device 110 then transmits a CPU control frame with appended word to the distributed switch system, directing the distributed switch ASIC to use to associated engine number in all subsequent frame appended words.

In one embodiment, learning frames are tagged as higher than normal traffic priority. This is necessary because these frames are used for managing traffic and needs to be resolved first before the actual transmitting of frames is to proceed. The highest priority queue is needed to minimize frame loss. In one implementation, a queuing engine is provided in a switching system, preferably in the switching ASIC of the switching system. This includes both the enqueuing and dequeuing logic. Each switching ASIC is to support unique levels of priority queues, with the highest priority being assigned to frames that are used exclusive for managing traffic. For example, frames for resolving the source and destination addresses and determining transmit ports need to be assigned with highest priority.

Several advantages are realized with the present invention. With a remote switching processing device, associations between MAC and network ports are learned through the distributed switching ASIC forwarding unknown address frames to the remote switching processing device. These forwarded unknown address frames are forwarded to the remote switching processing device using Ethernet ports. Each forwarded unknown address frame has an appended word containing an ingress switch engine number and an incoming port number. The remote switching processing device then updates the forwarding database of the distributed switching ASIC with this information. By utilizing the remote switching processing device and the Ethernet ports to learn associations between MAC and network ports, a processing device, such as a local CPU, does not to be present on every platform or switching system. Only the switching system containing the remote switching processing device needs to have a processing device. This reduces costs dramatically. Moreover, processing devices, such as CPUs, come with substantial overhead. Illustrative examples of such overhead are PCI buses, memory, flashes, and a number of other devices. By eliminating the need for a processing device, the need for the corresponding overhead is also eliminated. In embodiments where local processing devices are provided to distributed switching systems to allow localized optimization of some local CPU functions, low end CPUs can be utilized because the local processing device does not need to be involved in monitoring or controlling network traffic. This also saves system costs.

According to an embodiment of the present invention, the remote switching processing device 110 is utilized to allow a more general operation of having net identifications (netIDs) to supplant local CPU queues. The netIDs contain the append word feature, which is used to cascade other devices using a switching ASIC as a switching matrix. The NetIDs also contain the source addresses and destination addresses based mirror port information for global source and global destination address based mirroring. Frames which normally would go to a local switching processing device, such as a local CPU, are instead transmitted to the remote processing device 110 coupled to the switching ASIC 120 elsewhere in the stack of switches. In this case, the remote switching processing device 110 also needs to be able to uniquely identify an originating switching ASIC, so that the remote switching processing device 110 can respond to the originating switching ASIC. The frames also need to be tagged as higher than normal traffic priority. CPU queue number should also be preserved, e.g., having a unique netID per CPU queue. Upon receiving these frames, the remote switching processing device 110 processes these frames. If necessary, the remote switching processing device 110 responds by transmitting netID appended frames to an originating switching. ASIC and indicating the response as a "processing device directive." When these netID appended frames are received by the originating switching ASIC, these frames are processed just as if they were originated locally from a local switching processing device. In one implementation, secure ports are provided between different switching systems, such as the switching system 100 and switching system 200, and only processing device directives from secure ports are accepted. A secure port may, for example, be the stack port between the switching systems 100 and 200. In other embodiments, security ports are implemented using security protocols.

In one embodiment, each of the distributed switching systems 200, 300 are provided with a local processing device, such as a local CPU. The local processing device may be a low end processing device as compared to the remote switching processing device 110. This is because the local processing device does not need to be involved in monitoring and managing network traffic, e.g., with packet transfers to and from the switching ASICs. With local processing devices in the distributed switching systems 200, 300, not all processing device queues need to be sent to the remote switching processing device 110. This allows localized optimization of some processing device functions and allows the remote switching processing device 110 to send frames to the local processing devices. With low end processing devices, cost optimized distributed switching systems are achieved. The advantage of this implementation is a streamlined control flow of externally interconnected switching ASICs that can be managed as a single logic platform. For example, the configuration may be used to facilitate Single Point of Management (SPOM) in stackable switching router products, including 10/100 Mb 24 port stackable Ethernet switches, 10/100/1000 Mb 8 port stackable Ethernet routing switch, 10/100 Mb 24 port stackable Ethernet switch with stacking crossbar, and 10/100/1000 24 port stackable Ethernet routing switch. The SPOM feature gives a device manager the ability to manage a whole stack as one device with one IP address and gives a user the look and feel that a stack of switches is managed as a singe device.

Figure 4:
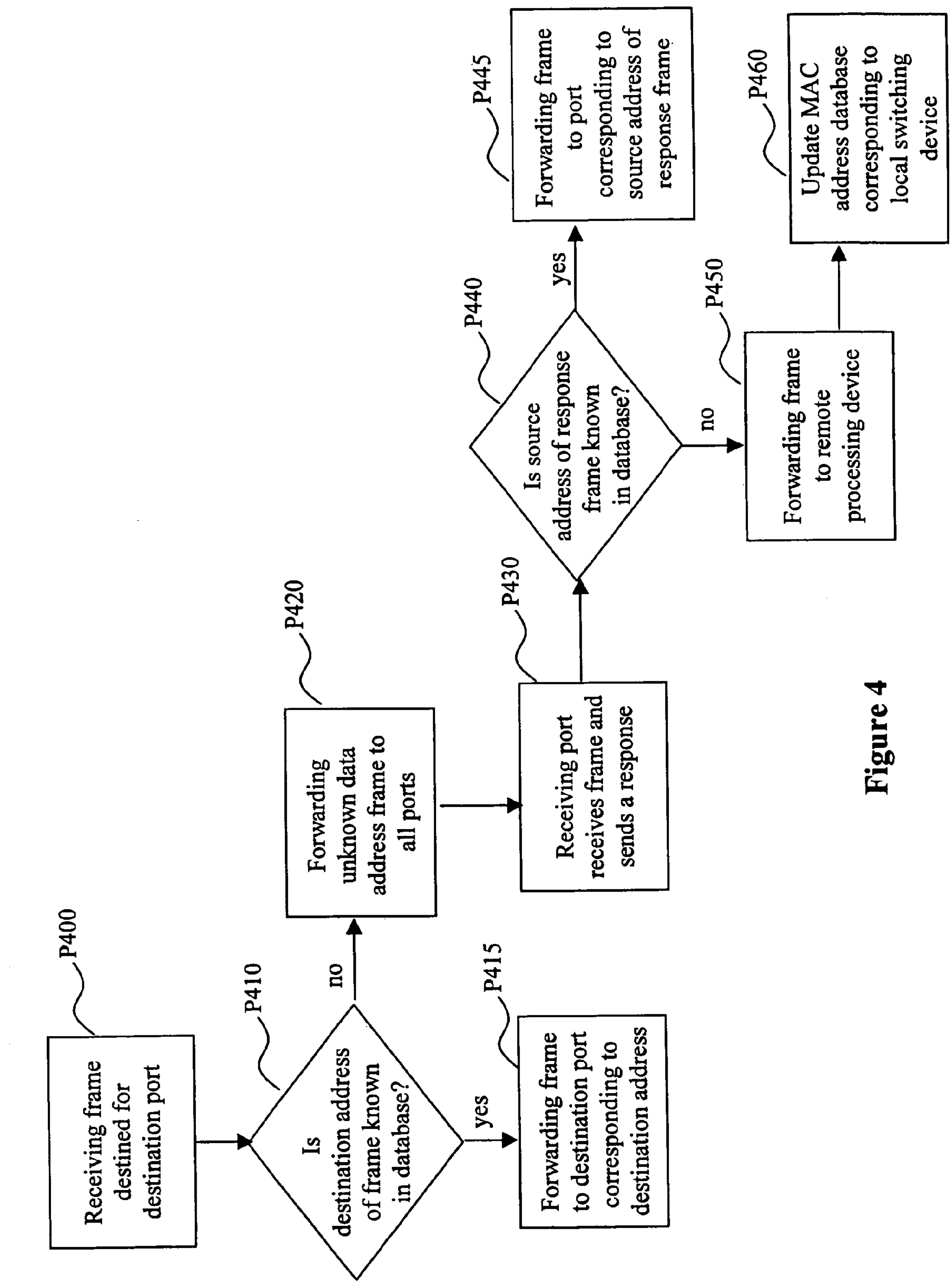
FIG. 4 illustrates processes for providing remotely controlled frames according to an embodiment of the present invention.

FIG. 4 illustrates processes for providing remotely controlled frames to monitor and control network traffic according to an embodiment of the present invention. In one embodiment, the system includes a number of local switching devices and a remote switching processing device. In block P400, a frame destined for a destination port is received by a local switching device from a source port. One of the elements included in the frame is a destination address of the destination port. In block P410, the destination address of the destination is analyzed. It is determined if the destination address of the frame is known in a Media Access Control (MAC) address database. In block P415, if the destination address is known in the MAC address database, the frame is forwarded to the destination port corresponding to the destination address. In block P420, the destination address is not previously known in the MAC address database, and an unknown destination address frame is forwarded to all ports asking for a response. In block P430, when the receiving port receives the unknown destination address frame, the receiving port sends a response frame back to the local switching device, where the unknown destination address frame originated in this embodiment. In block P440, it is determined if the source address of the response frame is known in the MAC address database. In block P445, if the source address of the response frame is known, the frame is forwarded to the port corresponding to the source address of the response frame. In block P450, if the source address of the response frame is not known previously, the response frame is forwarded to the remote processing switching device. In block P460, based on the received response frames as well as associated addresses and ports, the remote switching processing device updates the MAC address database corresponding to the local switching device and the local switching device learns associations between MAC addresses and ports.

Figure 5:
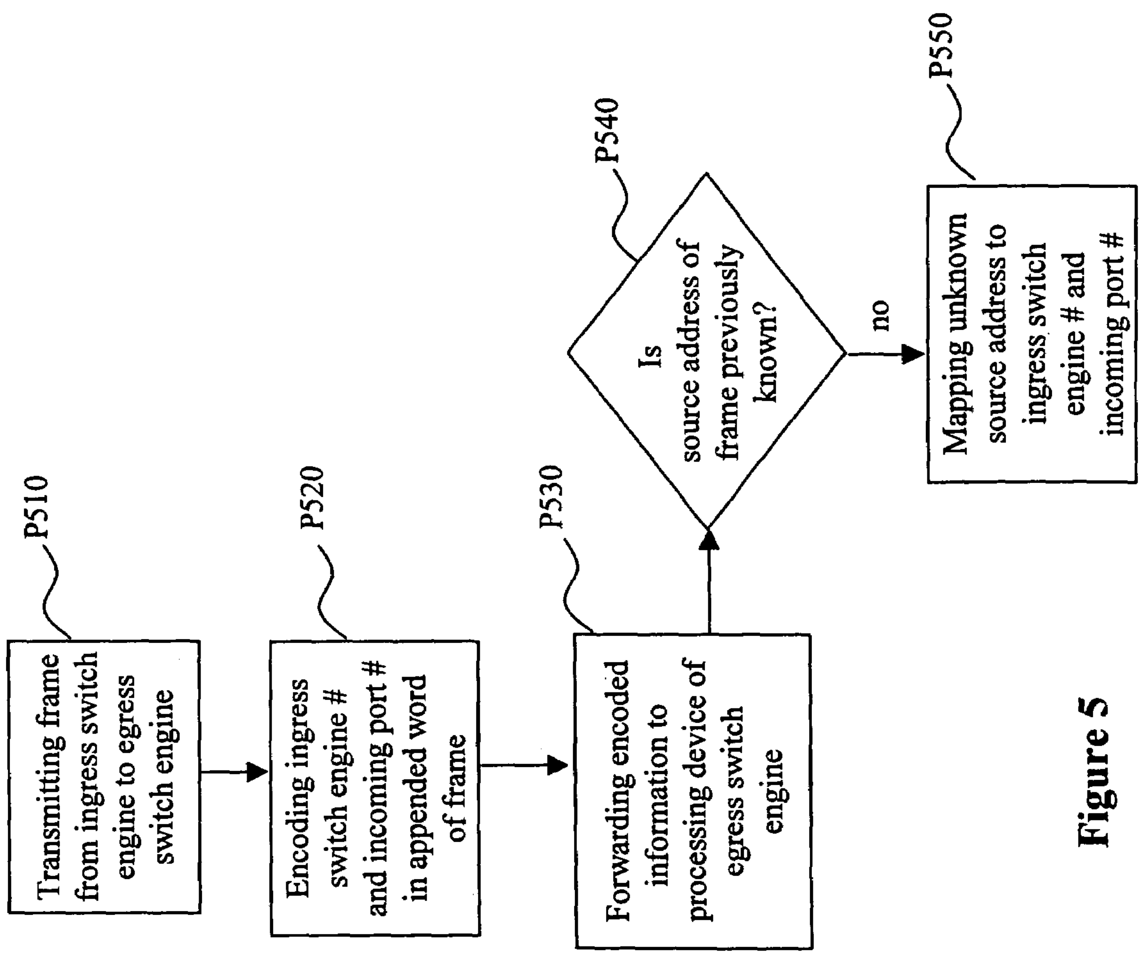
FIG. 5 illustrates processes for providing source address port mapping in a frame according to an embodiment of the present invention.

FIG. 5 illustrates processes for providing appended word source address port mapping in a frame and allowing autonomous forwarding database to be compiled according to an embodiment of the present invention. In block P510, a frame is transmitted from an ingress switch engine to an egress switch engine. In block P520, an ingress switch engine number and an incoming port number are encoded in an appended word of the frame. In one implementation, the numbers are encoded before the frame is transmitted. In other embodiments, the numbers are encoded during the transmission. The ingress switch engine number indicates a specific switching device from which the frame is being transmitted. The incoming port number indicates the port number of an incoming port from which the frame originated. In block P530, the encoded information is forwarded to a processing device of the egress switch engine. The processing device may, for example, be a CPU. In block P540, it is determined whether a source address of the frame is previously known. In block P550, when the source address is not previously known, the egress switch engine maps the unknown source address to the ingress switch engine number and the incoming port number.

While the description above refers to particular embodiments of the present invention, it will be understood that many modifications may be made without departing from the spirit thereof. For example, a switch/router ASIC that performs the functions of both conventional a switch and a router may be implemented in place of a switch ASIC that only performs the function of a conventional switch. Moreover, although the inventive concepts described herein utilize Ethernet protocols, these concepts are readily applicable to other types of networks. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system comprising:

a plurality of ports for sending and receiving frames;

a local switching device that performs packet switching;

a local forwarding database corresponding and coupled to the local switching device, the database allowing the local switching device to look up a known address that has been previously obtained and forward frames based on the known address; and a remote switching processing device having a programmable processor that receives and processes frames, wherein the local switching device sends an unknown destination address frame to all destination ports requesting a reply frame when a destination address is unknown in the local forwarding database, the local switching device receives the reply frame from a destination port at a local switching device receiving port and determines if a source address of the reply frame is known in the local forwarding database, and records associations between Media Access Control (MAC) addresses and local switching device receiving Ports by forwarding a response frame to the remote switching processing device, the remote switching processing device processes the received response frame and transmits a processing directive to the local forwarding database corresponding to the local switching device directing the local switching device to update the local forwarding database with information including the source address associated with the local switching device receiving port, and each of the forwarded frames includes an appended word, the appended word being encoded with an ingress switch engine number and an incoming port number, the ingress switch engine number indicating a specific local switching device, the incoming port number indicating the incoming port number of a port from which unknown address frames are being sent, the ingress switch engine and incoming port numbers being used to allow an egress switch engine to map the unknown addresses to the ingress switch engine number and the incoming port number.

2. The system of claim 1, wherein the ingress switch engine is the local switching device, and the incoming port is a port connected to the local switching device.

3. A method for monitoring and controlling network traffic in a system having a local switching device and a remote switching processing device, the method comprising:

receiving a frame from a source port, the frame being destined for a destination port indicated by a destination address of said frame;

determining if the destination address of said frame is known in a Media Access Control (MAC) address database;

forwarding the frame to the destination port when the destination address is known in the MAC address database;

sending an unknown destination address frame to all destination ports requesting a reply frame when the destination address is unknown in the MAC address database;

receiving said reply frame from the destination port at a local switching device receiving port;

determining if a source address of the reply frame is known in the MAC address database;

forwarding a response frame to the remote processing switching device;

receiving said response frame from the local switching device at said remote switching processing device;

processing the received response frame at the remote switching processing device; and transmitting a processing directive to the local forwarding database, corresponding to the local switching device, directing the local switching device to update the local forwarding database with information including the source address associated with the local switching device receiving port, the local switching device recording associations between MAC addresses and local switching device receiving ports, wherein each of the received frames from a source port and the reply frame from the destination port includes an appended word, the appended word being encoded with an ingress switch engine number and an incoming port number, the ingress switch engine number indicating a specific local switching device, the incoming port number indicating the incoming port number of a port from which unknown address frames are being sent, the ingress switch engine and incoming port numbers being used to allow an egress switch engine to map the unknown addresses to the ingress switch engine number and the incoming port number.

4. The method of claim 3, wherein the ingress switch engine is the local switching device, and the incoming port is a port connected to the local switching device.

* * * * *